(12) United States Patent
Collins et al.

(10) Patent No.: US 6,637,561 B1
(45) Date of Patent: Oct. 28, 2003

(54) VEHICLE SUSPENSION SYSTEM

(75) Inventors: David C. Collins, Burlington, MA (US); Robin Hossfield, Medway, MA (US); Joaquim A. Bento, Franklin, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/438,192

(22) Filed: Nov. 11, 1999

(51) Int. Cl.$^7$ .............................. F16F 7/10; B60G 13/00
(52) U.S. Cl. ................. 188/380; 280/124.108; 280/124.164
(58) Field of Search ................... 188/378, 379, 188/380; 280/124.162, 124.108, 124.111, 124.112, 124.164

(56) References Cited

U.S. PATENT DOCUMENTS

| | | | |
|---|---|---|---|
| 989,958 A | * 4/1911 | Frahm | 188/380 |
| 2,016,207 A | * 10/1935 | Lindenburg | 188/380 |
| 2,503,120 A | 4/1950 | Meyer | |
| 2,744,749 A | * 5/1956 | Fiedor | 267/253 |
| 2,887,071 A | * 5/1959 | Settles | 188/379 |
| 2,901,239 A | * 8/1959 | Sethna | 267/224 |
| 3,673,966 A | 7/1972 | Wilson | |
| 3,675,583 A | 7/1972 | Sobey et al. | |
| 3,788,233 A | 1/1974 | Colovas et al. | |
| 3,792,871 A | 2/1974 | Karim et al. | |
| 3,811,383 A | 5/1974 | Butzow | |
| 3,814,025 A | 6/1974 | Nelson | |
| 3,831,527 A | 8/1974 | Peterson | |
| 3,881,427 A | 5/1975 | Blume | |
| 3,913,491 A | 10/1975 | Auer et al. | |
| 3,977,487 A | 8/1976 | Katayose et al. | |
| 4,036,146 A | 7/1977 | Tyus | |
| 4,092,930 A | 6/1978 | Takemura et al. | |
| 4,183,304 A | 1/1980 | Forster | |
| 4,213,396 A | 7/1980 | Mehren et al. | |
| 4,223,611 A | 9/1980 | Dawson et al. | |
| 4,259,810 A | 4/1981 | West | |
| 4,265,180 A | 5/1981 | Uozumi | |

(List continued on next page.)

FOREIGN PATENT DOCUMENTS

| | | |
|---|---|---|
| DE | 1 161 936 | 1/1964 |
| DE | 14 05 857 A | 6/1970 |
| DE | 34 13 224 A | 11/1985 |
| DE | 40 32 378 | 4/1992 |
| DE | 43 01 986 A | 7/1994 |
| DE | 198 28 393 A1 | 7/1999 |
| EP | 88 241 B1 | 9/1983 |
| EP | 88 241 A | 9/1983 |
| EP | 464 720 A1 | 1/1992 |
| EP | 625 815 A2 | 11/1994 |
| EP | 747 281 A2 | 12/1996 |
| EP | 747 281 A3 | 8/1997 |
| FR | 605894 | 6/1926 |
| FR | 2 652 375 | 3/1991 |
| GB | 1 118 853 A | 7/1968 |
| SE | WO98 46467 | 10/1998 |

OTHER PUBLICATIONS

S. Timoshenko, Vibration Problems In Engineering May 1947, D. Van Nostrand Company, Inc., 2nd Edition, pp. 240–252.*

Clarence W. de Silva, Vibration Fundamentals and Practice 1999, CRC Press LLC, pp. 788–792.*

*Primary Examiner*—Jack Lavinder
*Assistant Examiner*—Thomas J. Williams
(74) *Attorney, Agent, or Firm*—Iandiorio & Teska

(57) ABSTRACT

A suspension system for a vehicle includes a dynamic absorber mass having a mass smaller than the sprung mass of the vehicle and a spring system supporting the dynamic absorber mass for out-of-phase coaxial motion with the vehicle and tuned to the ride frequency of the vehicle for damping ride frequency perturbations from the vehicle.

15 Claims, 7 Drawing Sheets

U.S. PATENT DOCUMENTS

| | | | |
|---|---|---|---|
| 4,267,779 A | | 5/1981 | Binder |
| 4,436,170 A | | 3/1984 | Mehren |
| 4,453,737 A | * | 6/1984 | Burchard et al. ..... 280/124.116 |
| 4,522,128 A | | 6/1985 | Anderson |
| 4,644,692 A | | 2/1987 | Schindehutte |
| 4,671,185 A | | 6/1987 | Anderson et al. |
| 4,697,781 A | * | 10/1987 | Hamano et al. ............ 188/379 |
| 4,706,788 A | * | 11/1987 | Inman et al. ............... 188/378 |
| 4,708,695 A | | 11/1987 | Sugiyama |
| 4,765,648 A | * | 8/1988 | Mander et al. .......... 267/64.18 |
| 4,798,254 A | * | 1/1989 | Lings ......................... 180/58 |
| 4,803,804 A | | 2/1989 | Bryant |
| 4,940,914 A | | 7/1990 | Mizuno et al. |
| 4,953,472 A | | 9/1990 | Tutzer |
| 4,960,290 A | * | 10/1990 | Bose ......................... 188/379 |
| 5,067,608 A | | 11/1991 | McLellan |
| 5,094,312 A | | 3/1992 | Hakel |
| 5,148,631 A | | 9/1992 | Bayard et al. |
| 5,277,124 A | | 1/1994 | DiFonso et al. |
| 5,323,989 A | * | 6/1994 | Hamada et al. ............. 248/260 |
| 5,364,121 A | * | 11/1994 | Lee ..................... 280/124.124 |
| 5,431,261 A | * | 7/1995 | Olgac ......................... 188/379 |
| 5,443,282 A | | 8/1995 | Gipser |
| 5,551,190 A | | 9/1996 | Yamagishi et al. |
| 5,558,191 A | * | 9/1996 | Lai ............................ 188/379 |
| 5,755,059 A | | 5/1998 | Schap |
| 5,799,924 A | * | 9/1998 | Slocum et al. .............. 248/636 |
| 5,832,665 A | | 11/1998 | Miller et al. |
| 5,845,581 A | | 12/1998 | Svensson |
| 5,848,663 A | | 12/1998 | Kuriki |
| 5,906,071 A | | 5/1999 | Buchanan, Jr. |
| 5,921,026 A | | 7/1999 | Miller |
| 5,979,114 A | | 11/1999 | Clark et al. |
| 6,009,671 A | | 1/2000 | Sasaki |
| 6,120,401 A | | 9/2000 | Wilken |

* cited by examiner

VEHICLE SUSPENSION SYSTEM

FIELD OF INVENTION

This invention relates to a suspension system for a vehicle.

BACKGROUND OF INVENTION

Conventional automobiles and trucks are equipped with soft suspension systems of from 0.8 Hz to 2.0 Hz ride frequency in order to accommodate anticipated road irregularities without discomfort to the passenger. Such soft suspension systems have significant vertical displacement depending on payload changes and thus are not suitable for vehicles which must dock and align vertically with a loading platform over a range of zero to full load. A number of different approaches have been employed to ensure the aligned docking required in some cases to no more than 5/8" vertical misalignment. For example, small boats at an amusement park ride are drawn up onto submerged rollers to fix the vertical position and prevent rolling during loading. In rail type transit systems complex pneumatic and hydraulic leveling systems are used to ensure vertical alignment between the cab and loading platform over the full range of passenger payload.

BRIEF SUMMARY OF THE INVENTION

It is therefore an object of this invention to provide an improved suspension system for a vehicle.

It is a further object of this invention to provide such an improved suspension system for a vehicle which aligns to loading platforms without need for a complex load leveling system.

It is a further object of this invention to provide such an improved suspension system for a vehicle which accommodates to road surface perturbations, reduces radial transmitted energy such as wheel imbalances or tire out-of-roundness and ensures passenger comfort.

It is a further object of this invention to provide such an improved suspension system for a vehicle which limits vehicle vertical motion and guideway height.

It is a further object of this invention to provide such an improved suspension system for a vehicle which provides compliance on uneven surfaces for better traction.

It is a further object of this invention to provide such an improved suspension system for a vehicle which provides stiffer suspension and more pitch and roll stability.

It is a further object of this invention to provide such an improved suspension system for a vehicle which reduces weight, cost and complexity.

The invention results from the realization that an improved, simpler suspension system for a vehicle which allows vehicle alignment with a loading platform over a wide range of payload while maintaining a safe comfortable ride can be effected by increasing the stiffness of the vehicle sprung mass and using a dynamic absorber mass having a smaller mass than the sprung mass of the vehicle tuned to the ride frequency of the vehicle and mounted for out-of-phase coaxial motion with the vehicle for damping ride frequency perturbations from the vehicle, and the further realization that despite the increased stiffness of the suspension irregularities in the roadway can be accommodated by compliant interconnection of the suspension system and vehicle and/or compliant wheels.

This invention features suspension system for a vehicle including a dynamic absorber mass having a mass smaller than the sprung mass of the vehicle, and a spring system supporting the dynamic absorber mass for out-of-phase coaxial motion with the vehicle and tuned to the ride frequency of the vehicle for damping ride frequency perturbations from the vehicle.

In a preferred embodiment the dynamic absorber mass may be substantially smaller than the sprung mass of the vehicle. It may be 5–15% of the spring mass of the vehicle and in one case may be 10% of the sprung mass of the vehicle. The sprung mass may include the drive system of the vehicle. The spring system may include a plurality of springs interconnected between the vehicle and dynamic absorber mass. The springs may include air bags. The ride frequency may be approximately 3.9 Hz. The suspension system may include a pair of wheels and it may include an axle interconnecting the wheels, two suspension arms connected to the axle, one proximate each wheel, each suspension arm including two spaced links and two pairs of compliant members for interconnecting each of the links of each of the suspension arms to the vehicle for maintaining traction between the wheels and road and accommodating for uneven surfaces of the road. The wheels may include compliant tires for maintaining traction between the wheels and road and accommodating for uneven surfaces of the road. The tires may be pneumatic tires.

The invention also features a vertical suspension system for a vehicle including a dynamic absorber mass having a mass smaller than that of the sprung mass of the vehicle and a spring system supporting the dynamic absorber mass for out-of-phase coaxial motion of the vehicle and tuned to the ride frequency of the vehicle for damping ride frequency perturbations from the vehicle. There are two pairs of wheels, an axle interconnecting each pair of wheels, two pairs of suspension arms connected to the axles one proximate each wheel, each suspension arm including two spaced links and four pairs of compliant members for interconnecting each of the links of the suspension arms to the vehicle for maintaining traction between the wheels and road and accommodating for uneven surfaces of the road. The wheels may include compliant tires and the tires may be pneumatic tires.

BRIEF DESCRIPTION OF THE DRAWINGS

Other objects, features and advantages will occur to those skilled in the art from the following description of a preferred embodiment and the accompanying drawings, in which.

DETAILED DESCRIPTION OF PREFERRED EMBODIMENT

Figure 1:
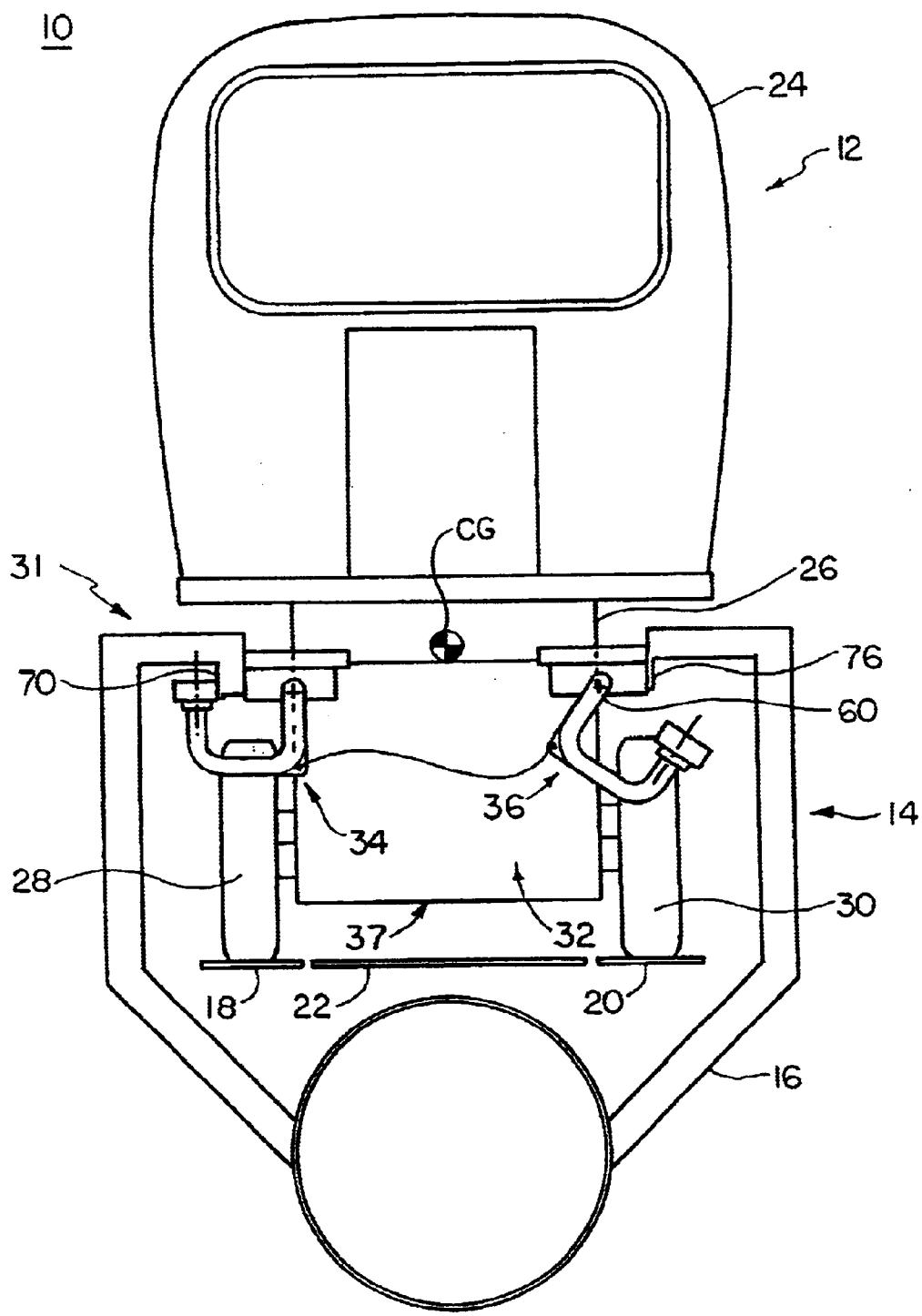
FIG. 1 is a front elevational diagrammatic view of a guideway and guided vehicle including a suspension system according to this invention.

There is shown in FIG. 1 a guided vehicle system 10 including a vehicle 12 which moves on a guideway 14. Guideway 14, includes a support structure 16 including main running surfaces 18 and 20 and a walkway or grate 22. Guided vehicle 12 includes cabin 24 mounted on chassis 26 which rolls on four main support tires only two of which, 28 and 30, are shown in FIG. 1, supported on running surfaces 18 and 20. Mounted on chassis 26 is a lateral suspension assembly 31 and an in-vehicle switch system 32 including two in-vehicle switch mechanisms 34 and 36 and a suspension system 37 according to this invention shown very simply schematically. Lateral suspension system 31 and in-vehicle switch systems 32, [34, 36] are shown approximately aligned with the center of gravity CG of the vehicle for purposes of stability and reducing deleterious forces. Either or both the lateral suspension system or the in-vehicle switch system may constitute a lateral guide device for operating the steering assembly. A lateral suspension system is shown in copending application filed on even date herewith entitled "Lateral Suspension Assembly for a Guided Vehicle System", by David C. Collins, Albert E. Lewis, and Gerald A. Garneau, Jr. An in-vehicle switch system is shown in a U.S. patent application filed on even date herewith entitled "In-Vehicle Switch Mechanism" by David C. Collins, Albert E. Lewis, and Gerald A. Garneau. A steering system is shown in a U.S. patent application filed on even date herewith entitled "Passive Steering Assembly for a Guided Vehicle", by Robin Hossfield, John Puhlhorn, David C. Collins, and Marvin Fredburg. Each of these applications is assigned to Raytheon Company and is incorporated herein by reference in its entirety.

Figure 2:
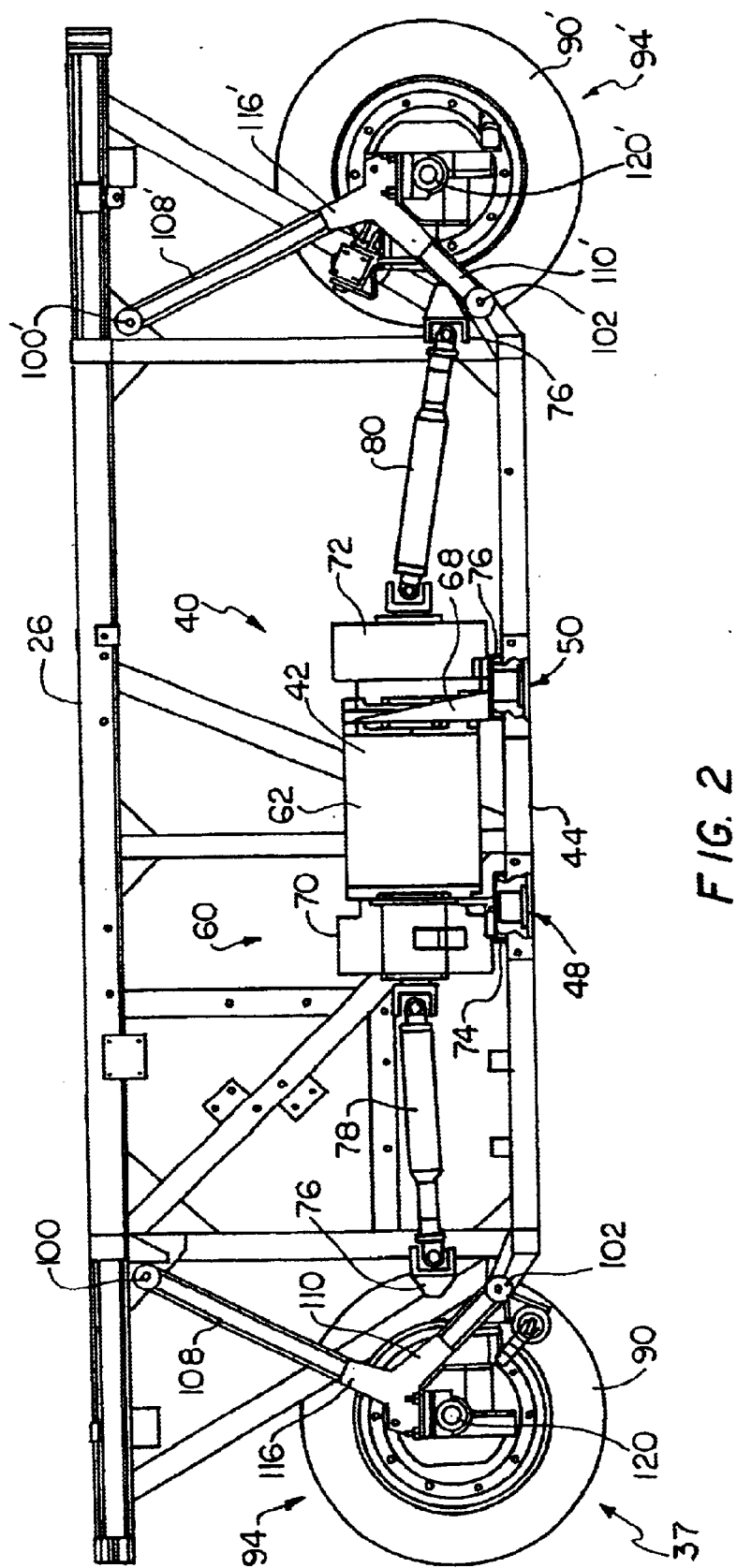
FIG. 2 is a side elevational sectional diagrammatic view along line 2—2 of FIG. 3, with portions broken away, of the chassis and suspension system of FIG. 1.
Figure 3:
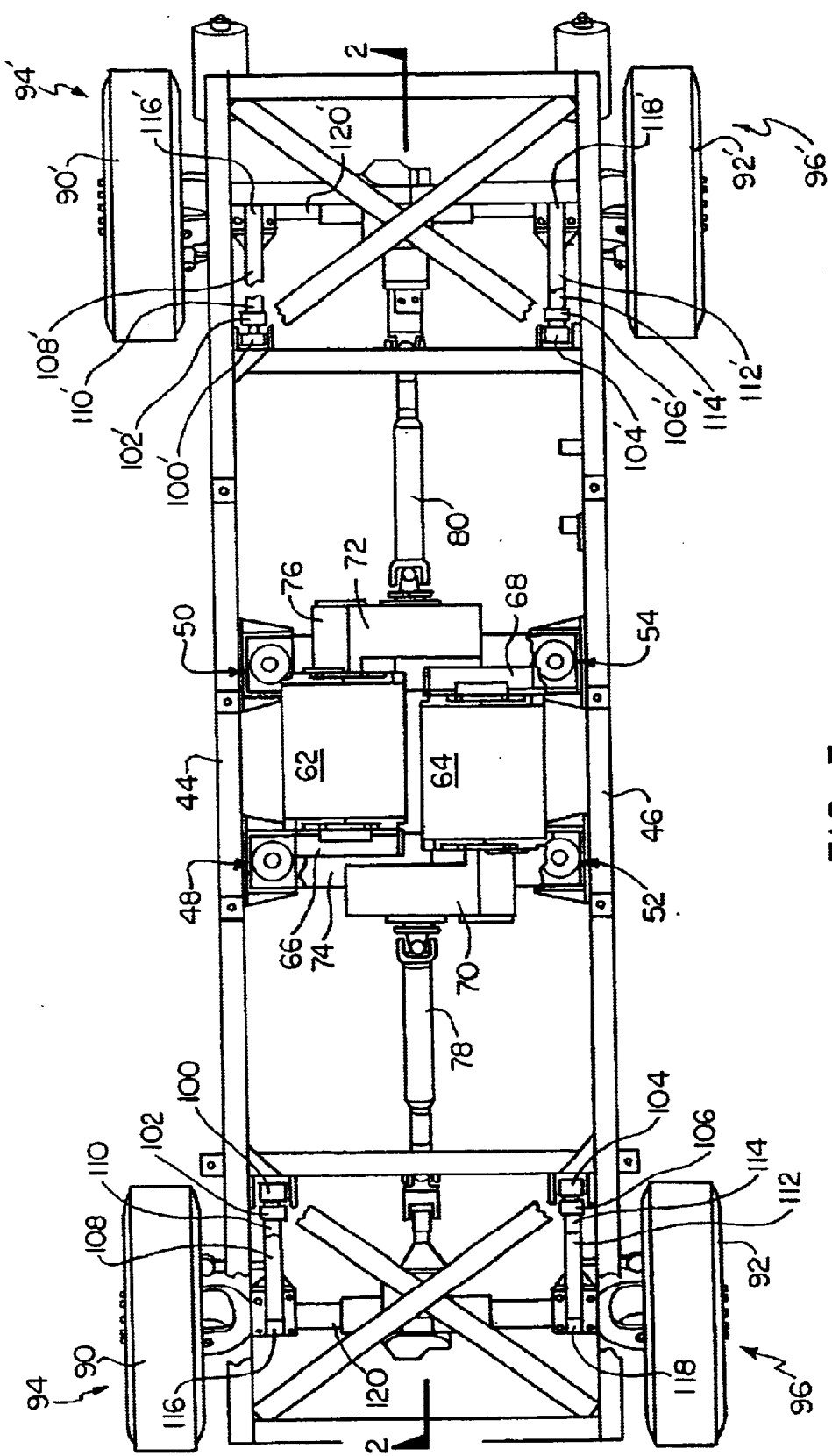
FIG. 3 is a top plan view with portions broken away of the chassis and suspension system of FIG. 2.

A vertical suspension system 37 according to this invention is shown on chassis 26 in conjunction with the following discussion with reference to FIGS. 2 and 3. Vertical suspension system 37 includes a dynamic absorber assembly 40 which includes a dynamic absorber mass 42 resiliently mounted to chassis members by means of resilient air bag assemblies 48, 50, 52 and 54 which makes dynamic mass 42 a sprung mass. Typically the sprung mass 42 of dynamic absorber assembly 40 is much smaller than the sprung mass of the entire vehicle, often in the range of 5–15% of the weight of the vehicle. In one preferred embodiment sprung mass 42 of the dynamic absorber assembly 40 is 10% of the sprung mass of the entire vehicle. For example, where the vehicle weighs 5000 pounds, mass 42 would be 500 pounds. In this particular embodiment mass 42 is made up of the drive system 60 for the vehicle including two drive motors 62, 64, their mounting brackets 66 and 68, gear boxes 70, 72, inverted channels 74 and 76, and one half the drive shafts 78 and 80 and one half of the air bag assemblies 48, 50, 52 and 54.

The mass of the entire vehicle is sprung through two mechanisms. First there is the compliance of the tires 90, 92, 90' and 92' which may be pneumatic tires forming a part of wheels 94, 96, 94' and 96'. Second, there are the elastomeric bushings 100, 102, 104 and 106 which are connected to the distal ends of spaced links 108, 110 and 112, 114 of suspension arms 116 and 118 which are fixed to axle 120 on which are mounted wheels 94 and 96.

Figure 4:
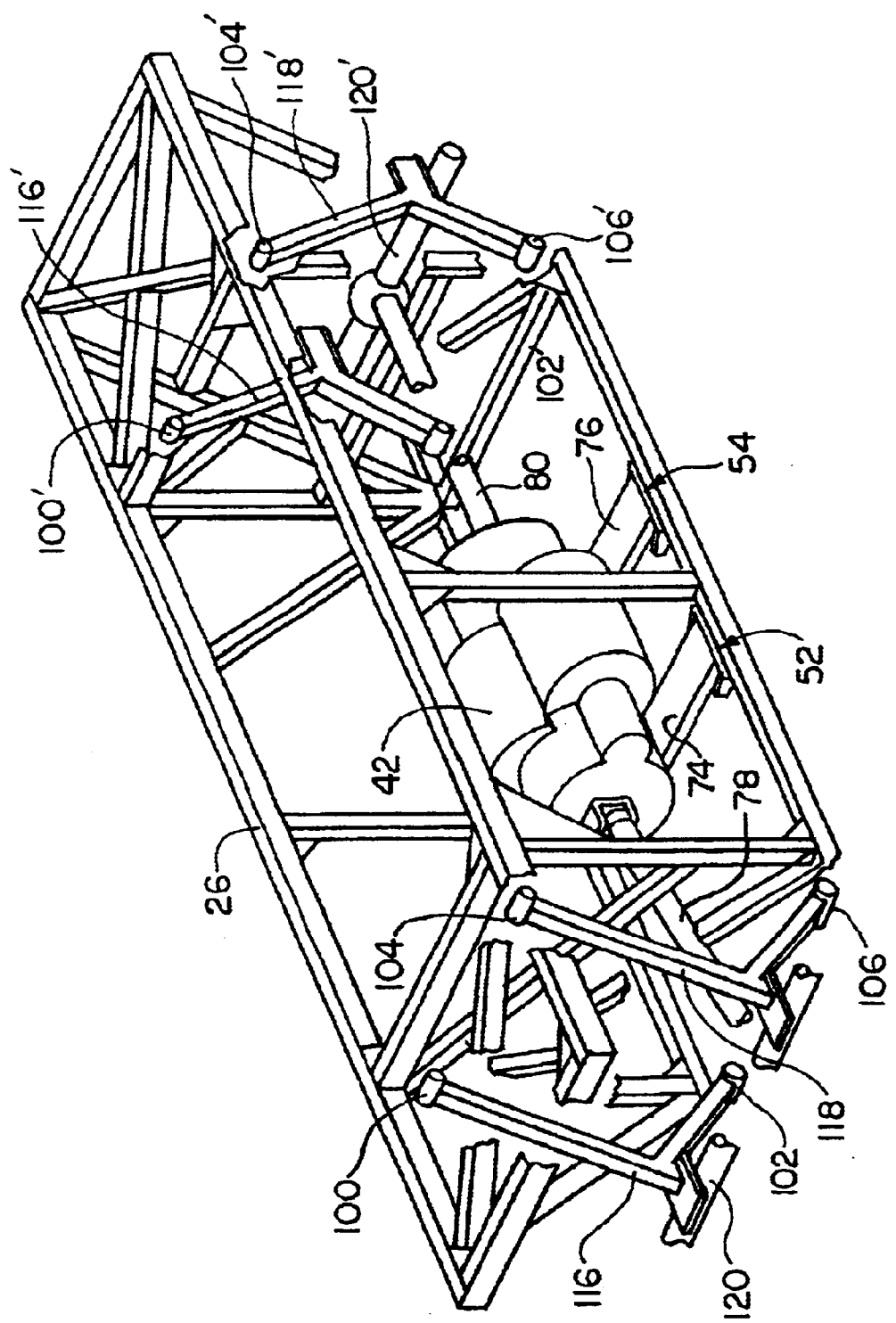
FIG. 4 is a simplified schematic three-dimensional view of the chassis and suspension system of FIGS. 2 and 3 with portions broken away.

In this vehicle a duplicate assembly is shown on the other end of chassis 26 where like parts are given like numbers primed. The structure and position of arms 116, 118 with respect to axle 120 and their elastomeric bushings 100, 102, 104 and 106 with chassis 26 is shown to greater advantage in the three-dimensional view of FIG. 4, as is the assembly at the other end showing A arms 116', 118' interconnected by their elastomeric bushings 100', 102', 104', 106' with the other end of chassis 26 and axle 120'.

Figure 6:
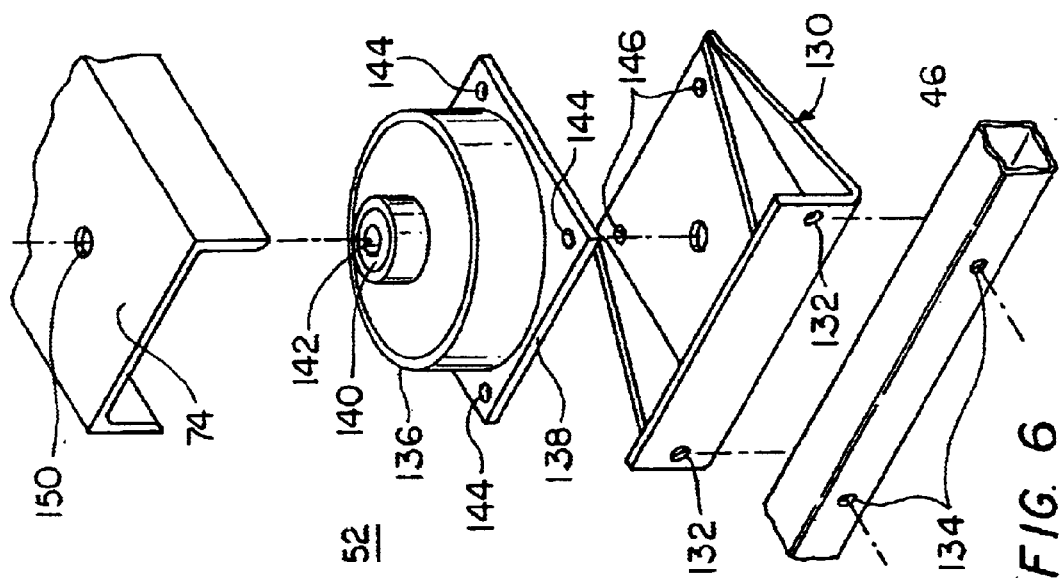
FIG. 6 is an exploded three-dimensional view of an airbag support assembly for the dynamic absorber of FIG. 5.
Figure 5:
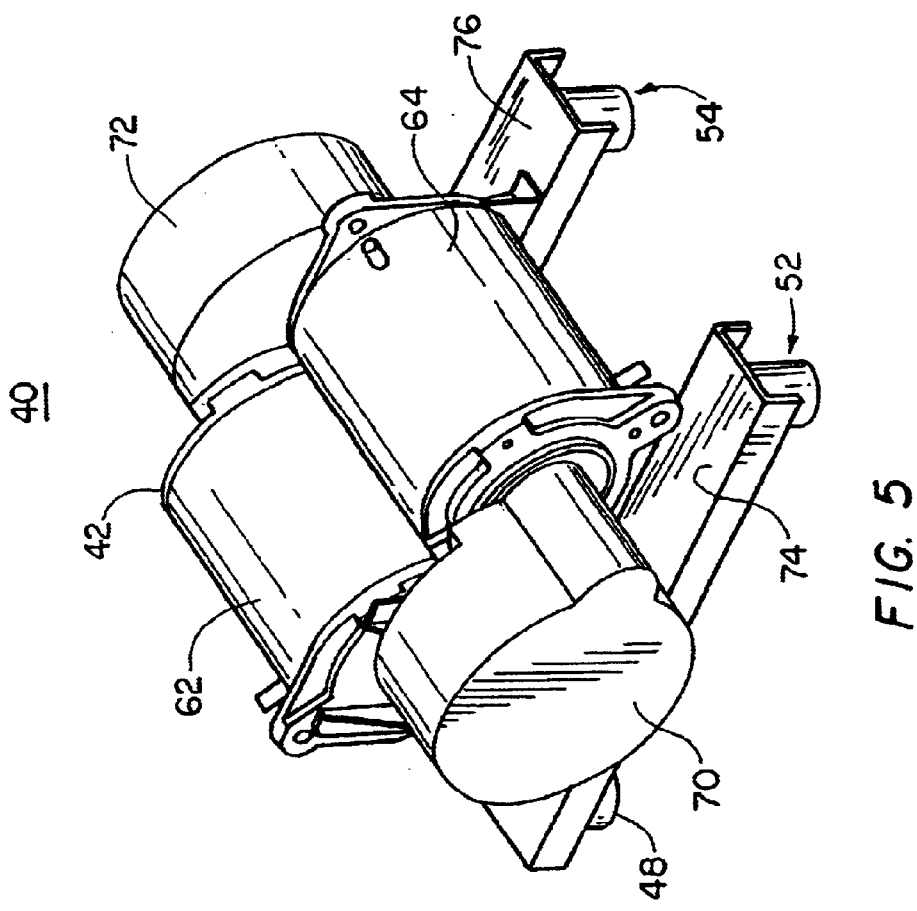
FIG. 5 is a three-dimensional view of a dynamic absorber according to this invention.

The dynamic absorber assembly 40 is shown to greater advantage in FIG. 5 where it can be seen that the mass 42 consisting of motors 62 and 64 and their associated gear boxes 70 and 72 are seen supported on inverted channels 74 and 76 which are sprung by means of air bag assemblies 48, 50 (not shown in FIG. 5), 52 and 54. Each air bag assembly is identical and is illustrated with respect to a single air bag assembly 52, FIG. 6. Air bag assembly 52 consists of a lower spring support 130 which is mounted by bolts, not shown, through bolt holes 132 to holes 134 in chassis member 46. Mounted to lower spring support 130 by means of bolts not shown is air bag 136 mounted on plate 138 and including a bushing 140 with a central bore 142 that passes right through air bag 136 and plate 138. Plate 138 is mounted to lower spring support 130 by bolts through holes 144 in plate 138 and holes 146 in lower spring support 130. A bolt, not shown, fastens directly through a hole 150 in inverted channel 74 through the bore 142 and bushing 140.

Figure 7:
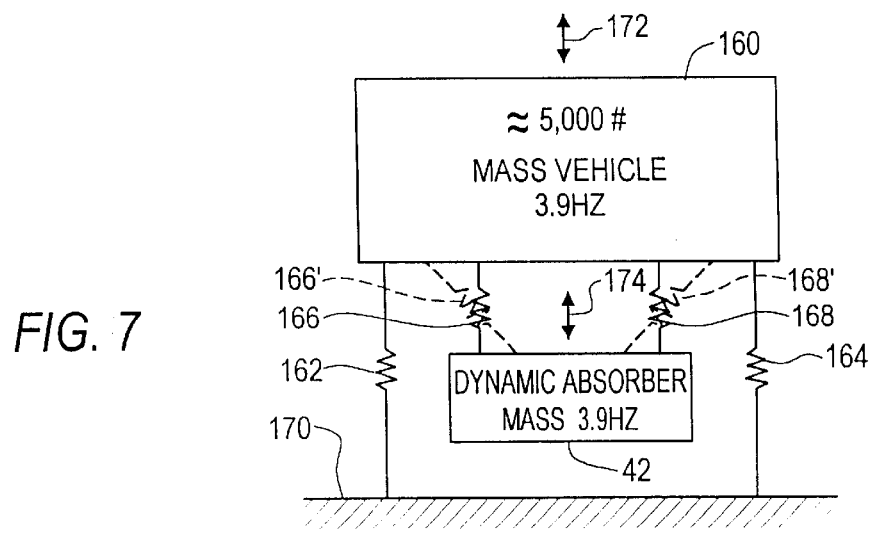
FIG. 7 is an equivalent spring and mass circuit of the suspension system according to this invention.

In operation the mass of the vehicle 160, FIG. 7, is sprung by the resilient action of the tires and of the elastomeric bushings which interconnect the A arms to the chassis. These resilient functions are represented by springs 162 and 164. Resiliently mounted or sprung from mass 160 is dynamic absorber mass 42. The air bags are the means by which the dynamic absorber mass is sprung. These are represented by springs 166 and 168. Their stiffness is chosen so that the dynamic absorber mass has the same frequency, 3.9 Hz, as the vehicle. In this way, as the vehicle runs over the ground or road surface 170, any shocks or vibrations in the 3.9 Hz range developed on the vehicle mass 160 will be transmitted to the dynamic absorber mass 42 and there dissipated or absorbed so that they are not communicated to the passengers in the cab. Dynamic absorber mass 42 should be mounted to vehicle mass 160 so that it is capable of coaxial motion. That is, whereas mass 160 moves in the direction of arrow 172, dynamic absorber mass 42 must also be able to move in that direction as indicated by arrow 174. The spring means themselves do not have to be coaxial although the motion should be. For example, the springs could be mounted as shown in phantom at 166' and 168'. The vertical motions that are induced on the dynamic absorber are approximately 180° out of phase with the vertical motions that are produced by the vehicle. In this way, the vibrational energy is transmitted to the dynamic absorber rather than the vehicle, thus reducing the vibration discomfort level in the vehicle.

Figure 8:
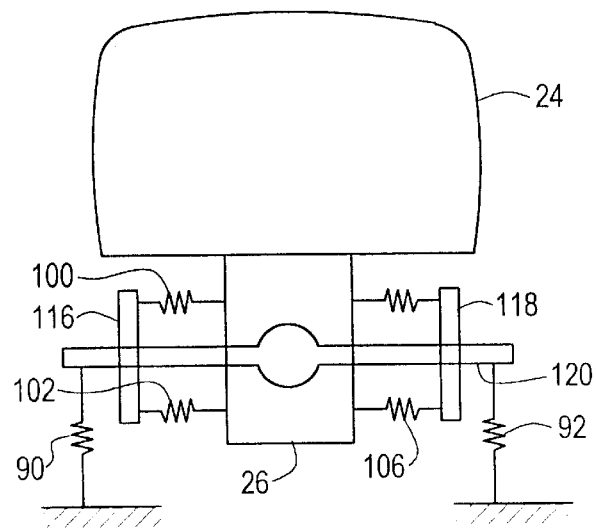
FIGS. 8 and 9 are equivalent circuits of the suspension system of FIG. 7 showing the response to planar and non-planar road surfaces.
Figure 9:
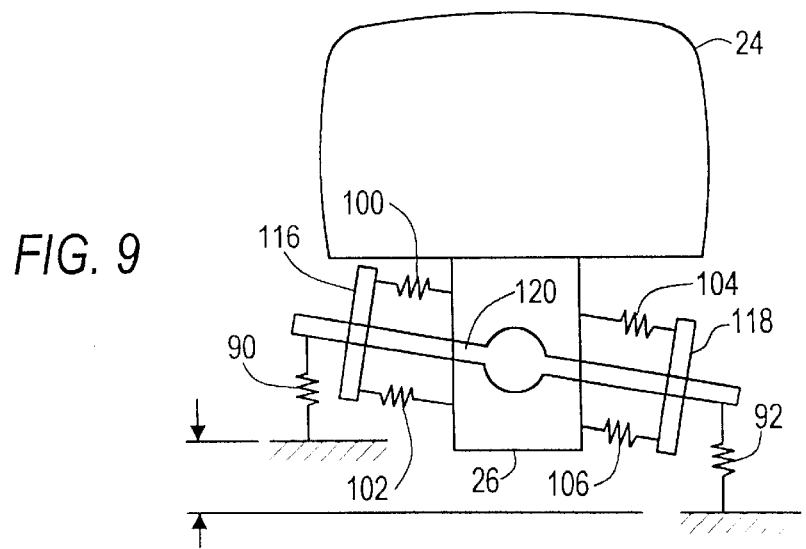

The manner in which the resilience or compliance of the tires and elastomeric bushings accommodate variations in traction and road surface uniformity without affecting the vehicle chassis and cab is shown in FIGS. 8 and 9. In FIG. 8, cab 24 and chassis 26 are properly vertically oriented as the vehicle moves across a flat road bed. Arms 116 and 118 are aligned with each other and are generally perpendicular to axle 120 while elastomeric bushings 100, 102, 104 and 106 are only under the normal stress. Tires 90 and 92, similarly, are normally aligned and stressed. In contrast, when there is a bump in the road so that one tire 90 must ride higher than the other tire 92, FIG. 9, each tire absorbs a portion of that accommodation and does so in conjunction with each of the elastomeric bushings 100, 102, 104 and 106 so that chassis 26 and cab 24 remain vertical and erect for the comfort of the passengers.

Figure 10:
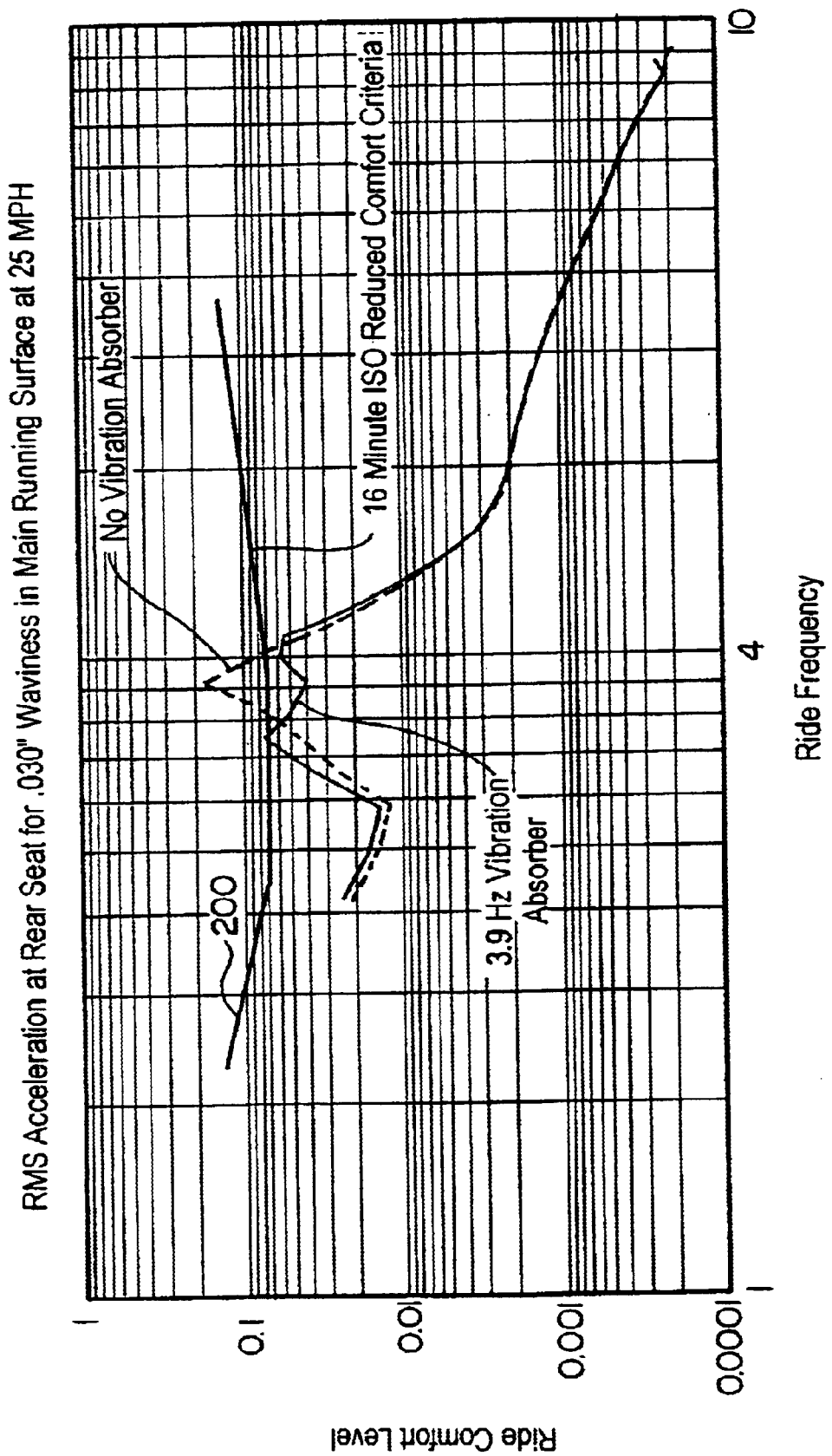
FIG. 10 is a graph illustrating the improvement in passenger comfort by reduction of accelerations effected by the action of the dynamic absorber in the vertical suspension system according to this invention.

The results, as shown in FIG. 10, are a substantial decrease in the acceleration (G's) which contribute to the ride comfort level of the passengers. The comfort criteria, FIG. 10, is indicated by the line 200. Without the vibration absorber with the stiffer suspension used to accommodate the load leveling feature of this invention, the accelerations at the stiffer 3.9 Hz ride frequency exceeds the comfort level line 200. However, with the 3.9 Hz vibration absorber assembly 40 in use the 3.9 Hz vibrations are substantially reduced and are below the comfort line 200. Thus the suspension system provides a stable vertical position over a wide range of loading yet provides a comfortable ride where the ride frequencies are well damped below the passenger discomfort level and the compliance of the portion of the system that maintains the sprung mass of the vehicle accommodates well for irregularities in the road surface.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A suspension system for a vehicle comprising:
    a dynamic absorber mass including the drive system of the vehicle, said dynamic absorber mass having a mass smaller than the sprung mass of the vehicle; and
    a spring system connecting the dynamic absorber mass to the vehicle and supporting said dynamic absorber mass for out-of-phase coaxial motion with the vehicle and tuned to the ride frequency of the vehicle for damping ride frequency perturbations from the vehicle, wherein said dynamic absorber mass has a frequency which is substantially the same as the ride frequency of the vehicle.

2. The suspension system of claim 1 in which said dynamic absorber mass is substantially smaller than the sprung mass of the vehicle.

3. The suspension system of claim 1 in which said dynamic absorber mass is 5–15% of the sprung mass of the vehicle.

4. The suspension system of claim 1 in which said dynamic absorber mass is 10% of the sprung mass of the vehicle.

5. The suspension system of claim 1 in which said spring system includes a plurality of springs interconnected between the vehicle and dynamic absorber mass.

6. The suspension system of claim 5 in which said springs include air bags.

7. The suspension system of claim 1 in which said ride frequency is about 3.9 Hz.

8. The suspension system of claim 1 further including a pair of wheels.

9. The suspension system of claim 8 further including an axle interconnecting said wheels, two suspension arms connected to said axle, one proximate each wheel, each suspension arm including two spaced links, and two pairs of compliant members for interconnecting each of said links of each of said suspension arms to the vehicle for maintaining traction between the wheels and road and accommodating for uneven surfaces of the road.

10. The suspension system of claim 8 in which said wheels include compliant tires for maintaining traction between the wheels and road and accommodating for uneven surfaces of the road.

11. The suspension system of claim 10 in which said tires are pneumatic tires.

12. A vertical suspension system for a vehicle comprising:
    a dynamic absorber mass including the drive system of the vehicle, said dynamic absorber mass having a mass smaller than the sprung mass of the vehicle;
    a spring system connecting said dynamic absorber mass to the vehicle and supporting said dynamic absorber mass for out-of-phase coaxial motion with the vehicle and tuned to the ride frequency of the vehicle for damping ride frequency perturbations from the vehicle, wherein said dynamic absorber mass has a frequency which is substantially the same as the ride frequency of the vehicle; and
    two pairs of wheels, an axle interconnecting each pair of wheels, two pairs of suspension arms connected to said axles, one proximate each wheel, each suspension arm including two spaced links and four pairs of compliant members for interconnecting each of said links of each suspension arm to the vehicle for maintaining traction between the wheels and road and accommodating for uneven surfaces of the road.

13. The vertical suspension system for a vehicle of claim 12 which said wheels include compliant tires for maintaining traction between the wheels and road and accommodating for uneven surfaces of the road.

14. The vertical suspension system for a vehicle of claim 13 which said tires are pneumatic tires.

15. A suspension system for a vehicle comprising:
    a dynamic absorber mass including the drive system of the vehicle, said dynamic absorber mass having a mass smaller than the sprung mass of the vehicle; and
    a spring system connecting the dynamic absorber mass to the vehicle and supporting said dynamic absorber mass for out-of-phase coaxial motion with the vehicle and tuned to the ride frequency of the vehicle for damping ride frequency perturbations from the vehicle, wherein the ride frequency is about 3.9 Hz and the dynamic absorber mass has a frequency which is the same as the ride frequency.

* * * * *